(12) United States Patent
Caillet et al.

(10) Patent No.: US 9,248,899 B2
(45) Date of Patent: Feb. 2, 2016

(54) SOUNDPROOFING COVERING HAVING RESONATORS, A PANEL PROVIDED WITH THE COVERING, AND AN AIRCRAFT

(71) Applicant: AIRBUS HELICOPTERS, Marignane (FR)

(72) Inventors: Julien Caillet, Bouc Bel Air (FR); Thomas Manfredotti, La Colle sur Loup (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/527,105

(22) Filed: Oct. 29, 2014

(65) Prior Publication Data

US 2015/0114751 A1    Apr. 30, 2015

(51) Int. Cl.
  *B64C 1/40*      (2006.01)
  *E04B 1/84*      (2006.01)
  *G10K 11/172*    (2006.01)

(52) U.S. Cl.
  CPC ... *B64C 1/40* (2013.01); *E04B 1/84* (2013.01); *G10K 11/172* (2013.01)

(58) Field of Classification Search
  CPC ............ B64C 1/40; G10K 11/172; F16F 7/10
  USPC ................................. 181/207, 286
  See application file for complete search history.

(56) References Cited

U.S. PATENT DOCUMENTS

| | | | |
|---|---|---|---|
| 6,851,515 | B2 | 2/2005 | Dussac et al. |
| 8,616,330 | B1 * | 12/2013 | McKnight ............. G10K 11/16 181/207 |
| 2009/0078519 | A1 | 3/2009 | Carcaterra et al. |
| 2011/0005165 | A1 | 1/2011 | Stadthagen-Gonzalez |
| 2011/0020592 | A1 | 1/2011 | Manfredotti et al. |
| 2011/0079477 | A1 * | 4/2011 | Dandaroy ................. B64C 1/40 188/378 |
| 2011/0189440 | A1 | 8/2011 | Appleby et al. |

FOREIGN PATENT DOCUMENTS

| | | |
|---|---|---|
| FR | 2815603 | 4/2002 |
| FR | 2939406 | 6/2010 |
| WO | 2012131011 A2 | 10/2012 |
| WO | 2012131011 A3 | 10/2012 |

OTHER PUBLICATIONS

French Search Report for FR 1302538, Completed by the French Patent Office on Jul. 10, 2014, 7 Pages.

* cited by examiner

*Primary Examiner* — Jeremy Luks
(74) *Attorney, Agent, or Firm* — Brooks Kushman P.C.

(57) ABSTRACT

A soundproofing covering (10) having resonators (30). Said covering (10) comprises a trellis (20) provided with at least two resonators (30) and at least one stud (50) for fastening at least two resonators (30) to a panel (5) that is to be treated, each resonator (30) including a blade (31) extending longitudinally in a plane (P1) from one end (32) of the resonator (30) that is fastened to a stud (50) to another end (33) of the resonator (30), said blade (31) having at least one transverse protuberance (35) for oscillating in an elevation direction (D1) perpendicular to said plane (P1), each stud (50) extending in elevation from a face for securing to the panel (5) that is to be treated towards each resonator (30) fastened to the stud (50), at least one stud (50) having damper means (60) interposed between said face and each of the resonators (30) fastened to the stud.

17 Claims, 4 Drawing Sheets

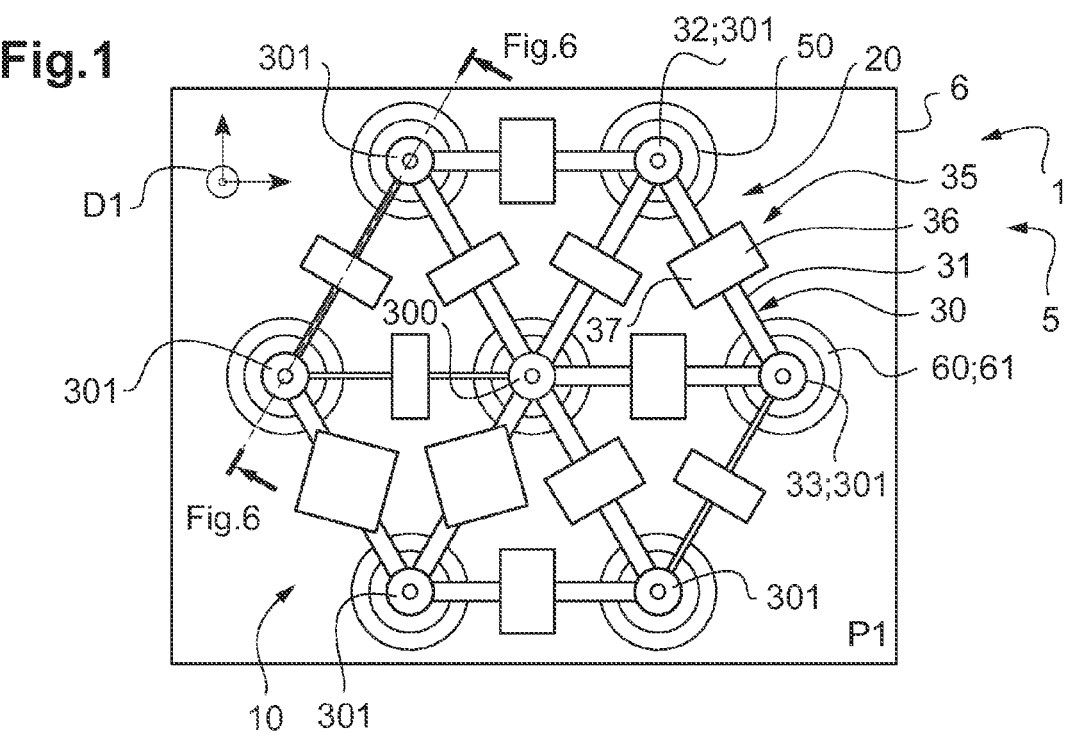
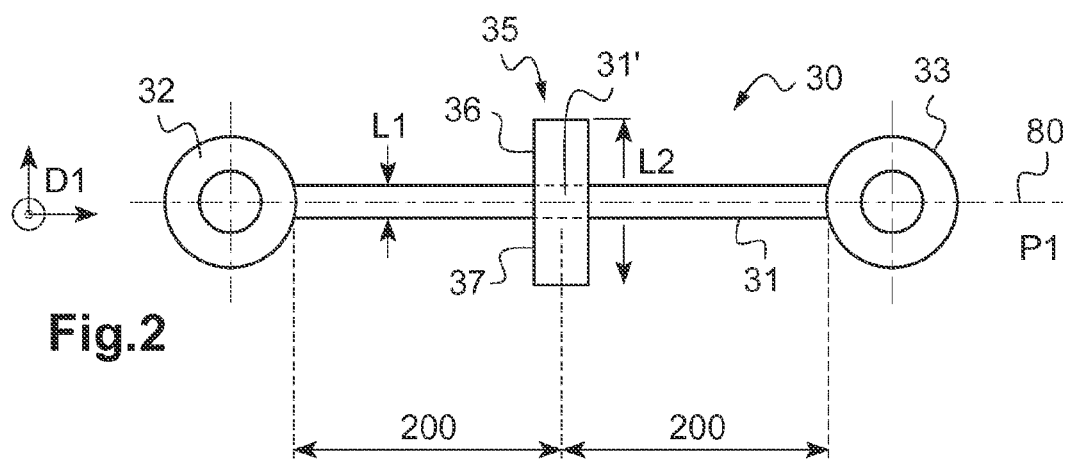
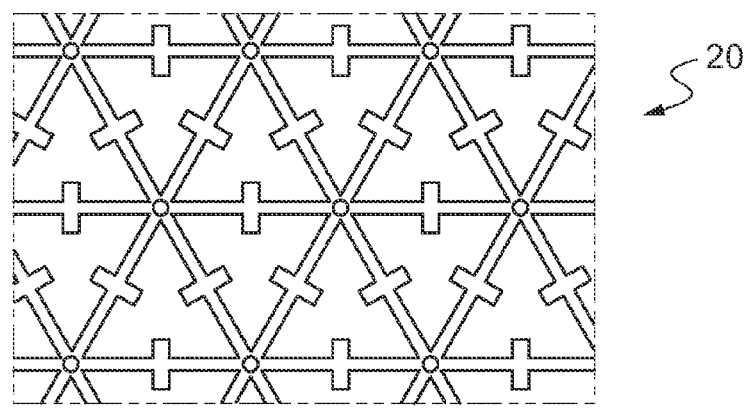

SOUNDPROOFING COVERING HAVING RESONATORS, A PANEL PROVIDED WITH THE COVERING, AND AN AIRCRAFT

CROSS REFERENCE TO RELATED APPLICATION

This application claims priority to French patent application No. FR 13 02538 filed on Oct. 31, 2013, the disclosure of which is incorporated in its entirety by reference herein.

BACKGROUND OF THE INVENTION (1) Field of the Invention

The present invention relates to a soundproofing covering having resonators, to a panel including the covering, and to an aircraft.

The invention thus lies in the field of treating acoustic nuisance on board an aircraft.

(2) Description of Related Art

The present invention relates more particularly to systems for treating noise. Reducing the sound level of noise is an ever-increasing problem given the impacts of noise on the comfort and the health of people. This problem is encountered particularly, but not exclusively, in the technical field of aircraft, and in particular of rotary wing aircraft.

A rotary wing aircraft has at least one lift rotor that is driven in rotation by a power train, and possibly also a tail rotor for providing the aircraft with yaw control. The power train may include at least one engine and at least one main gearbox (MGB) interposed between the engine and the lift rotor.

Furthermore, an aircraft may have moving mechanical members for cooling equipment on board the aircraft, and in particular for cooling the main gearbox and also electronic equipment. Moving mechanical members may also be used for delivering air into a cabin. Conventionally, a fan is used for cooling equipment and/or for moving a mass of air.

Thus, such an aircraft generally has multiple noise sources, including for example a main gearbox, turboshaft engine blades, or indeed fans.

Under such circumstances, these sources of noise may immerse a rotorcraft with the entire frequency spectrum that is audible to humans, this audible noise frequency spectrum extending from a frequency component of about 20 hertz (Hz) to a frequency component of about 20,000 Hz.

A structural panel or cladding for an aircraft generally includes at least one wall made of metal, of composite, and/or of thermoplastic materials.

Several solutions have already been proposed in order to attenuate the noise transmitted through such panels.

In order to improve the soundproofing of panels for noise emitted at medium frequencies, conventionally understood as frequencies in the range 300 Hz to 1000 Hz, a first solution in widespread use relies on adding a layer of elastomer material to an outer surface of a panel.

That addition also presents the characteristic of increasing the mass per unit area of the panel. Unfortunately, the soundproofing capacity of a panel mainly follows a "weight" relationship whereby the soundproofing capacity of a panel as measured in decibels varies in proportion to the logarithm of the weight per unit area of the panel. Increasing the weight per unit area of the panel thus tends to optimize the acoustic performance of the panel, but to the detriment of the overall weight of the aircraft.

The elastomer layer also increases the damping of the panel thus making it possible to reduce the negative effect of potential vibratory resonances with auxiliary elements.

However, that first solution suffers from the drawback of increasing the weight of the panel.

Document FR 2 815 603 suggests incorporating a solid body in composite panels of sandwich structure, the solid body being incorporated in a closed space inside the sandwich structure.

That second solution is remarkable in that it enables the sandwich structure to be damped while adding little extra weight.

It is particularly effective for noise emitted in the high frequency range, but its effectiveness is less good for noise emitted at medium frequencies.

Document US 2011/0020592 proposes incorporating dissipative elements, in particular elements of elliptical geometry, in order to improve the damping of structural panels or cladding with little added weight. Such a dissipative element may amplify the movement of masses within a plane that is substantially parallel to the panel that is to be treated.

Under such circumstances, the weight per unit area of a panel may be increased at reduced "weight" cost.

Document FR 2 939 406 suggests interposing a foam between two walls. When a first wall is excited by noise, the second wall provides a vibratory response that seeks to eliminate the original excitation, like a resonator.

The foam optionally includes inserts to avoid sagging.

The effect of those solutions is particularly effective for seeking noise emitted at high frequency. Nevertheless, treating noise emitted at medium frequency is found to be difficult, and may lead to providing a device of high weight.

Active techniques based on actuators, e.g. piezoelectric actuators, have also been proposed, but they can present drawbacks such as complexity, cost, or indeed requiring the incorporation of high-power electronic equipment.

Other concepts are used for improving the soundproofing of panels, e.g. based on adding microperforations in a wall.

Also known are Documents US 2011/0189440, US 2011/0005165, WO 2012/131011, and US 2009/078519.

BRIEF SUMMARY OF THE INVENTION

An object of the present invention is thus to propose a covering suitable for being applied on a structural panel or cladding. The covering seeks to reduce the transmission of noise through the panel with little extra weight, while targeting noise reduction in a medium frequency band for example, where prior art means are sometimes relatively ineffective at low cost in terms of weight. The proposed covering may be used in addition to any or all of the concepts described above, for example.

According to the invention, a soundproofing covering is provided with resonators.

The covering comprises a trellis provided with at least two resonators and at least one stud for fastening at least two resonators to a panel that is to be treated, each resonator including a blade extending longitudinally in a plane from one end of the resonator that is fastened to a stud to another end of the resonator, said blade having at least one transverse protuberance for oscillating in an elevation direction perpendicular to said plane, each stud extending in elevation from a face for securing to the panel that is to be treated towards each resonator fastened to the stud, at least one stud having damper means interposed between said face and each of the resonators fastened to the stud.

Under such circumstances, the covering makes use of a trellis of resonators. For example, the trellis may be machined from a block of metal material using conventional techniques that are relatively inexpensive. A machined plate may be obtained in particular by cutting out with the help of a waterjet or of a laser, or indeed by chemical machining.

The trellis may also be fabricated with the help of composite materials.

The function each resonator has is to filter vibration of a panel at the frequencies that are the most troublesome from the point of view of passenger comfort, and in particular at medium frequencies.

The effect of the resonators is to smoother vibration by creating anti-resonance centered on a given set frequency referred to as the "anti-resonance" frequency. The width of the band of frequencies that is treated is maximized by the damper means.

Under such circumstances, the trellis has at least two resonators that may be referred to as "damped" resonators because of the presence of the damper means.

When the panel fitted with the covering vibrates under the effect of sound waves, for example, the resonators deform in an elevation direction that is substantially perpendicular to the panel, unlike devices of the type described in Document US 2011/0020592.

That deformation is damped by the damper means. The damped deformation of a resonator then serves to treat the vibration of the panel over a broad frequency band centered on the anti-resonance frequency to which the resonator is set.

In particular, the trellis may be used to treat noise emitted in the so-called "medium" frequency range that typically extends from 300 Hz to 1000 Hz on board an aircraft, where conventional noise reduction means may present a ratio of soundproofing effectiveness divided by added weight that is limited or that may present integration constraints that are not compatible with the intended applications.

The frequency band treated by the covering is determined directly by the geometry of the resonators of the trellis and by the damping selected for the damper means via the studs. The covering can thus be adapted to the intended frequency band and to the basic composition of the panel that is to be treated.

The anti-resonance frequency of a resonator is proportional to the square root of the quotient of the stiffness of the resonator divided by its mass. An operator can thus adapt the geometry of the protuberances of the resonator blades so as to obtain a mass giving rise to the desired anti-resonance frequency.

In addition, each resonator presents a protuberance that is sufficient for causing the resonator blade to oscillate when a panel vibrates.

Under such circumstances, the trellis may possess small thickness. The weight of the covering can then be relatively small, thereby imparting an optimized ratio of soundproofing effectiveness divided by added weight.

In addition, the trellis is then sufficiently flexible to be capable of being arranged on panels that may be curved, for example.

Thus, the covering tends to reduce the transmission of noise emitted at medium frequencies through structural panels or cladding of aircraft, while giving rise to an increase in the weight of the panel that is small and while presenting an overall size that is also small.

Furthermore, the panel is relatively simple and inexpensive to make.

In addition, at least one stud comprises a base provided with a face for securing to a panel that is to be treated and a shank passing through one end of at least one resonator, a radial clearance separating each shank from the resonator, the stud including attachment means clamping one end of at least one resonator against the base.

The term "radial clearance" is used to designate a gap greater than mere manufacturing clearance that allows an item to be engaged on a shank or some other item.

Consequently, the trellis is attached to the stud by attachment means such as grippers or nuts.

In addition, each stud may be fastened in a panel by conventional means, e.g. by adhesive or by screw-fastening, for example.

At each stud, radial clearance is provided between the trellis and the shank of the stud in order to accommodate potential expansion differences between the material constituting the panel that is to be treated and the material used for constituting the trellis, e.g. steel. Thus, each end of a resonator having a stud passing therethrough may have an orifice of diameter that is greater than the diameter of the shank of a stud.

Furthermore, the radial clearance imparts freedom to move in elevation to the associated resonator. Under such circumstances, the radial clearance may lie in the range one millimeter to two millimeters, for example.

This radial clearance also makes it possible to arrange the trellis on a multitude of studs without giving rise to initial stresses on the resonators.

In contrast, the base may present a diameter that is greater than the diameter of such an orifice.

The covering may have one or more of the following additional characteristics.

Thus, a resonator may present a first width in a transverse direction that is constant between its ends, with the exception of at least one zone of the blade that includes a protuberance that presents a second transverse width greater than the first width.

The second width may optionally vary longitudinally or it may be constant, depending on the geometry of the protuberance. Such a resonator presents the advantage of being capable of being manufactured at low cost.

Furthermore, at least two resonators optionally present protuberances having geometries that are distinct.

In particular, two resonators may present blades that are identical with the exception of their protuberances that present geometries that are distinct.

The term "geometry" is used to mean the shape and/or the dimensions of the protuberances. For example, two protuberances of two resonators may be in the form of slabs having lengths that are different. In another example, some protuberances are in the form of slabs and others are in the form of cylinders.

Consequently, such a covering makes it possible to treat multiple frequency bands simultaneously by using different resonators.

For example, it is found to be possible to treat the medium frequency range by using three different types of resonator.

At least one protuberance of at least one resonator may also be made up of two transverse extensions extending transversely on either side of a blade, a longitudinal axis of symmetry of the blade also representing an axis of symmetry of the transverse extensions. This symmetrical configuration tends to enhance the oscillating movement of the resonator in a direction that is substantially orthogonal to the panel that is to be treated.

Furthermore, at least two resonators connected to a common stud optionally present an end in common.

Thus, at least two resonators are secured to each other via a common end. The resonators may be obtained by machining a plate of material for this purpose.

In addition, at least one resonator may be connected to a first stud via one end and to a second stud via another end. The ends of the resonator may be common with other resonators.

Both ends of a resonator may thus be connected to a panel that is to be treated.

The trellis may thus be a machined plate, each resonator having at least one end in common with another resonator.

The trellis may optionally be fabricated by using conventional techniques for cutting out a plate, such as a waterjet-cutting technique, a laser-cutting technique, or a punching technique. Such machining enables trellises to be obtained of any shape, in particular in terms of the geometry of the protuberances.

The trellis may also be adapted to a variety of panel shapes, without requiring complex tooling. Thus, a cladding or structural panel is initially fabricated so as to obtain its final shape, which may possibly be curved, and then the covering is applied directly to the panel.

In summary, such fabrication is thus simple and inexpensive.

Furthermore, at least one blade may have a thickness in said elevation direction that is less than one millimeter.

A trellis in the form of a plate may thus be small in thickness. This small thickness makes it easier to put into place on a panel that is curved. Furthermore, this thickness makes it possible, surprisingly, to avoid the trellis buckling while it is being mounted on a panel.

Furthermore, at least one blade optionally presents a protuberance at equal distances from the first end and the second end of said blade.

In addition, the covering may include a cover for protecting the trellis against impacts.

Furthermore, said damper means may comprise a damper washer surrounding each stud.

Damping is created by washers that are added to the studs. By way of example, these washers may be made of foam (EPDM, silicone, etc.) and/or of elastomer. Under such circumstances, each washer is inserted around a stud by being placed between the trellis and the panel that is to be treated.

Each blade of a resonator is then pressed against a damper washer. Each washer may also include thickness that is slightly greater than the thickness of the bases of the studs in order to guarantee that it is compressed by a blade.

The diameter of these washers serves to adjust the amount of damping that is provided, and consequently to adjust the bandwidth over which the covering is effective.

Furthermore, the washers also serve to avoid any problem of galvanic corrosion of the trellis, where applicable.

In order to put a covering into place, the studs are fastened to the panel that is to be treated. Thereafter, the trellis is engaged on the shanks of the studs, and then the trellis is secured to the shanks by the attachment means.

Furthermore, said covering may include at least one weight member connecting together at least two blades of two resonators.

This weight member seeks to optimize the weight of the covering.

For example, said weight member connects together at least two protuberances of at least two blades of two resonators.

In an embodiment, the trellis comprises a machined plate having a plurality of resonators, each resonator extending longitudinally between two perforated ends, each end being common to a plurality of resonators, each end being engaged on a shank of a stud, each stud being surrounded in part by a damper washer.

In addition to a covering, the invention provides a panel including at least one wall.

The panel then includes at least one covering of the above-described type, each trellis of a covering being fastened to a wall of the panel solely by the studs of the trellis.

The proposed invention may be applied to any type of panel such as a panel having a core interposed between two walls, a panel having at least one monolithic wall, or indeed a panel including a soundproofing system.

Furthermore, the panel may be covered in part by each covering.

The invention also provides an aircraft including such a panel.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 shows an aircraft provided with a covering of the invention as seen from above;

FIG. 2 shows a resonator of the invention;

FIG. 3 shows a trellis having resonators that are identical;

DETAILED DESCRIPTION OF THE INVENTION

Figure 4:
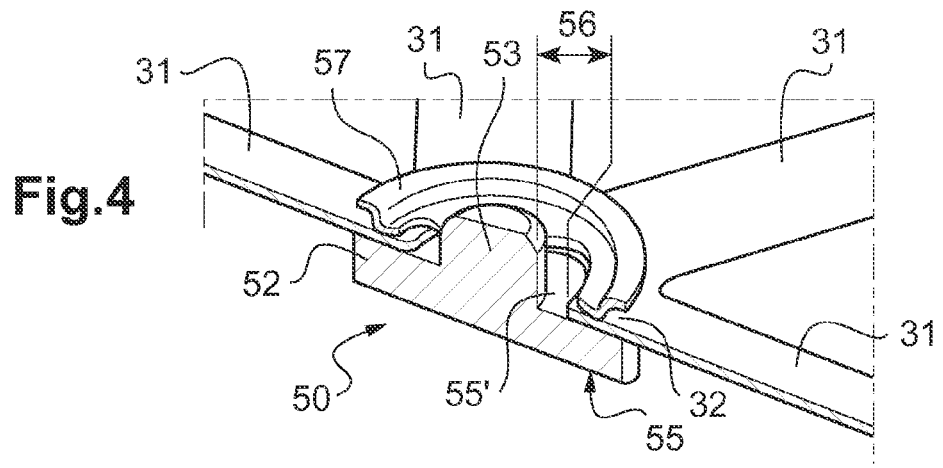
FIG. 4 shows a stud co-operating with a gripper for clamping a trellis of resonators.

Elements shown in more than one of the figures are given the same references in each of them.

FIG. 1 shows an aircraft 1 having a panel 5 as seen from above. The other members of the aircraft are not shown in order to avoid unnecessarily cluttering the figure.

The panel 5 comprises at least one wall 6. Any type of panel may be used. For example, the panel may have at least two walls on either side of a core so as to form a structural sandwich, or it need not have such a core. At least one wall of a panel may be fabricated using a composite material or indeed it may be machined from a block of material.

The panel 5 is also provided with at least one covering 10 of the invention. FIG. 1 shows a panel fitted with a single covering, however the panel could be fitted with a plurality of coverings, depending on requirements.

Such a covering is provided with a trellis 20 having resonators 30 and studs 50 for fastening the resonators to the panel.

The trellis 20 has at least two resonators 30.

With reference to FIG. 2, each resonator has a blade 31 extending longitudinally along a longitudinal axis 80. More precisely, the blade 31 extends between one end 32 of the resonator referred to as its "first end" and another end 33 of the resonator referred to as its "second end". At least one end is then connected to a stud. The term "end" applies to either one of the first and second ends of a resonator.

The thickness of the blade in an elevation direction D1 is contained in a plane P1 that is substantially parallel to the panel 5 that is fitted with the covering. This thickness is advantageously less than 1 millimeter (mm), and may for example lie in the range 0.3 mm to 0.8 mm.

Furthermore, a resonator has a first width L1 that is substantially constant between its first end 32 and its second end 33, with the exception of at least one zone 31' of the blade 31 that includes a transverse protuberance 35. Consequently, the blade 31 of a resonator presents the first width L1 other than in zones presenting respective protuberances 35.

Each protuberance 35 extends transversely from a blade 31 so as to impart a second width L2 on said zone 31', which width is greater than the first width L1 and may be continuous or varying.

The term "protuberance" 35 is used to mean a projection that extends transversely from the zone 31' of the blade 31. Thus, a protuberance 35 has at least one extension 36, 37 projecting transversely from the blade 31.

By way of example, a protuberance 35 has two extensions 36, 37 extending transversely and optionally symmetrically on either side of a zone 31' of the blade 31.

Furthermore, a resonator may have a protuberance arranged symmetrically between its first end 32 and its second end 33. A protuberance 35 is thus at equal distances 200 from each of these ends 32, 33.

With reference to FIG. 1, the trellis may have resonators provided with different protuberances in order to treat noise emitted at a variety of frequencies. Two protuberances of two distinct resonators may thus have shapes and/or dimensions that are different.

By way of example, two resonators may then present blades that are identical and/or protuberances that are geometrically different.

In contrast, FIG. 3 shows a variant of a trellis having resonators that are identical.

With reference to FIG. 1, at least two resonators 30 may possess an end 32, 33 in common so as to be connected to the same stud 50.

In the example of FIG. 1, a central end 300 of the trellis is common to six resonators extending radially from that end. In contrast, the other ends 301 of the resonators situated at the periphery of the trellis are each common to three resonators.

Furthermore, at least one resonator 30 is connected to a first stud 50 via one end 32 and to a second stud 50 via another end 33. In the example of FIG. 1, each resonator extends between two ends, each connected to a respective stud.

When the resonators are connected in pairs via respective ones of their ends, the trellis 20 may be obtained from a machined plate. Fabricating such a trellis is then easy. The trellis thus presents a mesh having nodes and elongate members, each node being represented by one end of at least one resonator and each elongate member being represented by a blade of a resonator.

Independently of the embodiment, the trellis is thus fastened to the panel 5 by studs 50, each stud 50 connecting one end of at least one resonator to the panel 5. At least one stud may be adhesively-bonded or screw-fastened to the panel 5, for example.

With reference to FIG. 4, a stud may extend in elevation from a base 52 fastened to a panel to a shank 53 around which one end of at least one resonator is engaged.

The base 52 then has a face 55 for fastening to a panel, and a surface 55' from which the shank of the stud 53 extends. The base 52 may then possess dimensions that are greater than the dimensions of the shank 53, e.g. their diameters in the context of a base and a shank that are both cylindrical.

Under such conditions, the base of a stud is fastened to a panel 5 via said face 55. In contrast, the shank 53 of the stud passes through an orifice in one end of a resonator. Radial clearance 56 is advantageously provided between the shank 53 and the corresponding end of the resonator.

In order to fasten the trellis to a stud, the stud then has attachment means for holding the trellis against the stud.

In FIG. 4, the attachment means comprise a gripper 57.

Figure 5:
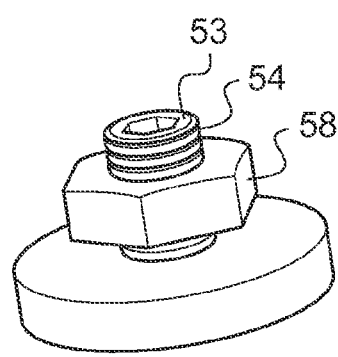
FIG. 5 shows a stud co-operating with a nut for clamping a trellis of resonators.

However in FIG. 5, the attachment means comprise a nut 58 co-operating with a thread 54 on the shank 53 of the stud.

These examples are given by way of illustration, and any fastener means could be implemented. For example, at least one stud may be secured to the trellis, representing a component member of the trellis.

Figure 6:
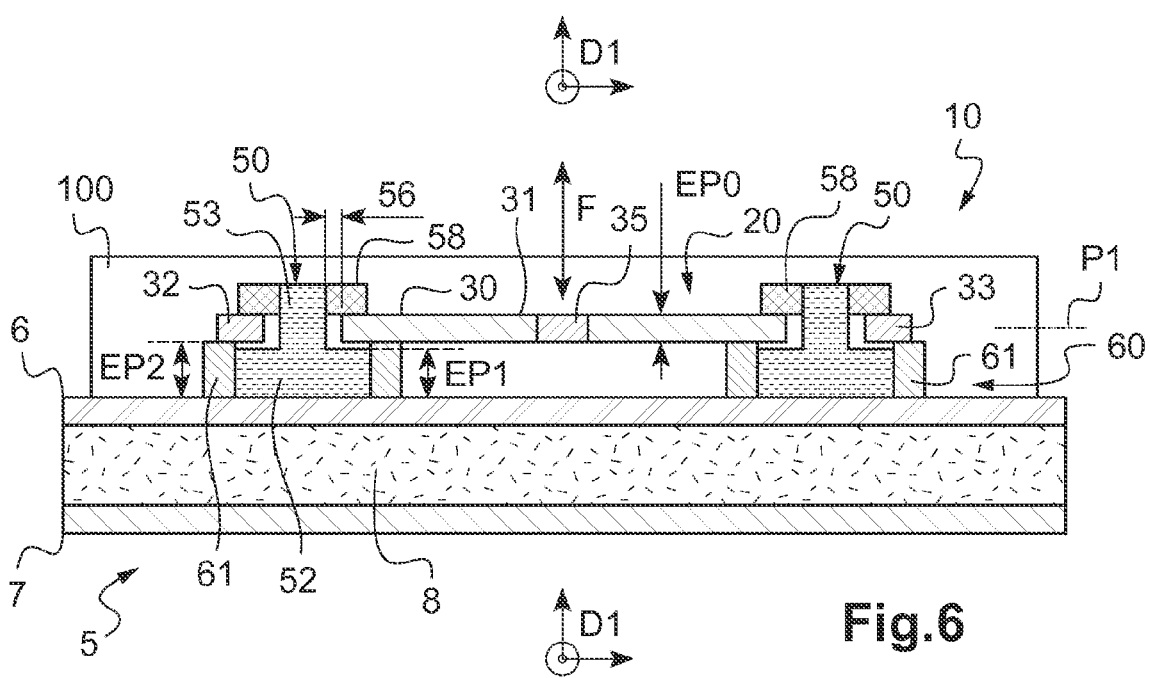
FIG. 6 is an elevation view in a section of a panel as shown in FIG. 1.

FIG. 6 is a section view of a covering resting on a panel 5.

The panel 5 may have a single wall, or it may comprise a sandwich with a core 8 arranged between two walls 6 and 7, for example.

In one embodiment, the trellis 20 of the covering comprises a machined plate having a plurality of resonators 30. Each resonator 30 extends longitudinally between two perforated ends 32, 33, with each end 32, 33 being common to a plurality of resonators 30 and being engaged on a shank 53 of a stud 50.

Furthermore, at least one stud 50 includes damper means 60 interposed between the face 55 of the stud that is secured to the panel 5 and each resonator 30 fastened to the stud. For example, each stud may include such damper means.

Damper means may comprise a damper washer 61 surrounding the stud 50.

Thus, the washer 61 advantageously presents damping thickness EP2 greater than the bearing thickness EP1 of the base of a stud so as to guarantee contact between the blade of the resonator and the washer. It should be observed that in an alternative solution that is not shown, it would be possible to arrange the washer 61 between the surface 55' of the stud 50 and the resonator.

The covering may also include a cover 100 for protecting a trellis.

Figure 7:
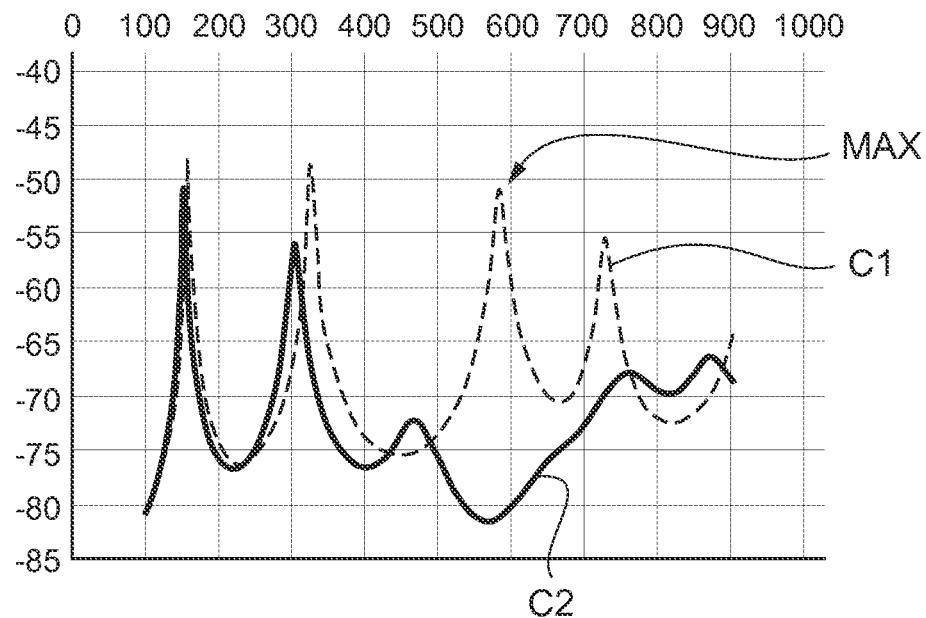
FIGS. 7 and 8 are plots showing the results obtained after arranging a covering of the invention on a panel.
Figure 8:
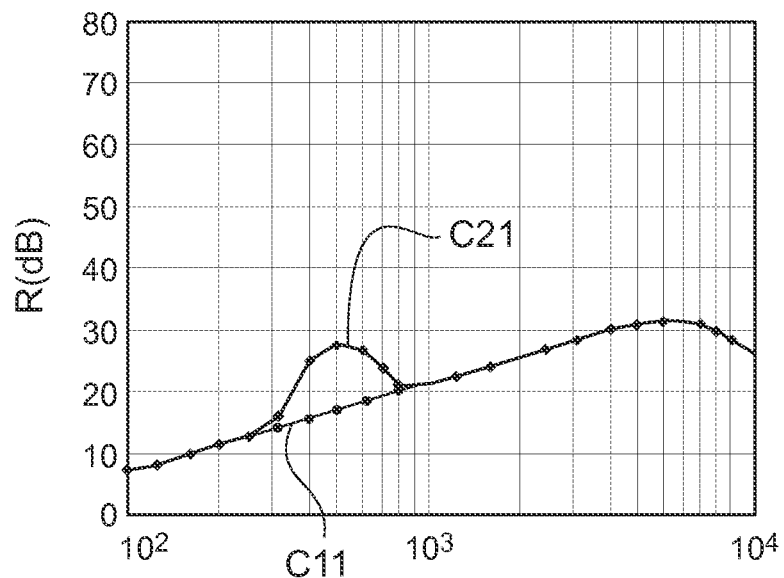

FIGS. 7 and 8 show the effectiveness of such a covering, independently of its variant.

When noise excites a panel 5 fitted with the invention, the panel begins to vibrate. Depending on the excitation frequency, each resonator may vibrate by deforming in an elevation direction D1 perpendicular to the panel 5 and to the plane P1 in which the blade 31 of the resonator is to be found at rest. Each resonator then filters the vibration of the panel in order to tend to attenuate it.

By arranging resonators presenting distinct protuberances, it is possible to filter a plurality of distinct kinds of noise.

FIG. 7 is a plot with vibration frequency plotted along the abscissa axis and vibratory response of a panel plotted up the ordinate axis.

The first curve C1 thus shows the vibratory response of a panel that does not have a covering of the invention, while the second curve C2 thus shows the vibratory response of a panel fitted with a covering of the invention.

In the absence of the invention, the vibratory response of the panel without a covering of the invention presents a peak MAX at a medium frequency of about 580 Hz. Conversely, the covering of the invention enables this peak to be eliminated, as shown in the second curve.

FIG. 8 shows the acoustic attenuation that can result from using a covering of the invention.

FIG. 8 is a plot with vibration frequency plotted along the abscissa axis and with the acoustic attenuation provided by the panel under study plotted up the ordinate axis.

The first curve C11 thus shows the acoustic attenuation provided by a panel that does not have a covering of the invention, while the second curve C21 shows the acoustic attenuation provided by a panel fitted with a covering of the invention.

It can be seen that the covering tends to improve the acoustic attenuation of a panel in a medium frequency range.

Figure 9:
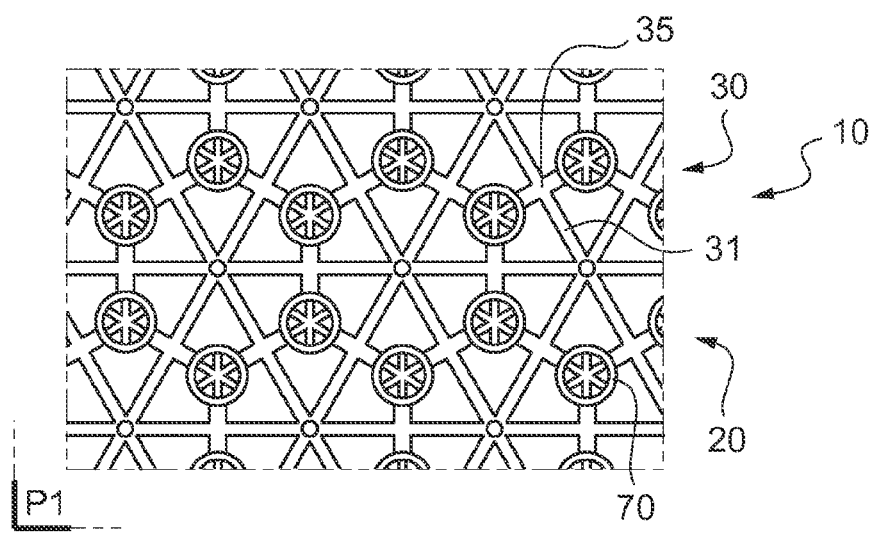
FIGS. 9 to 11 are diagrams showing variants provided with weight members arranged between at least two resonators.
Figure 10:
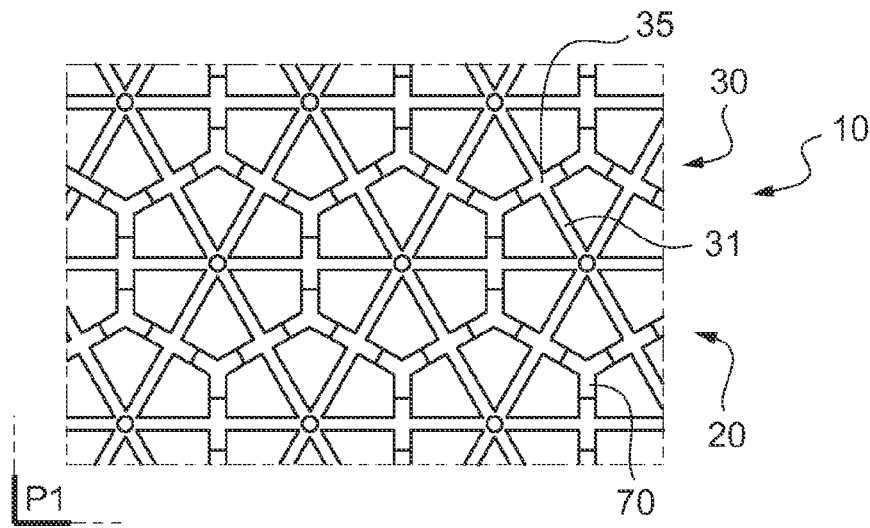
Figure 11:
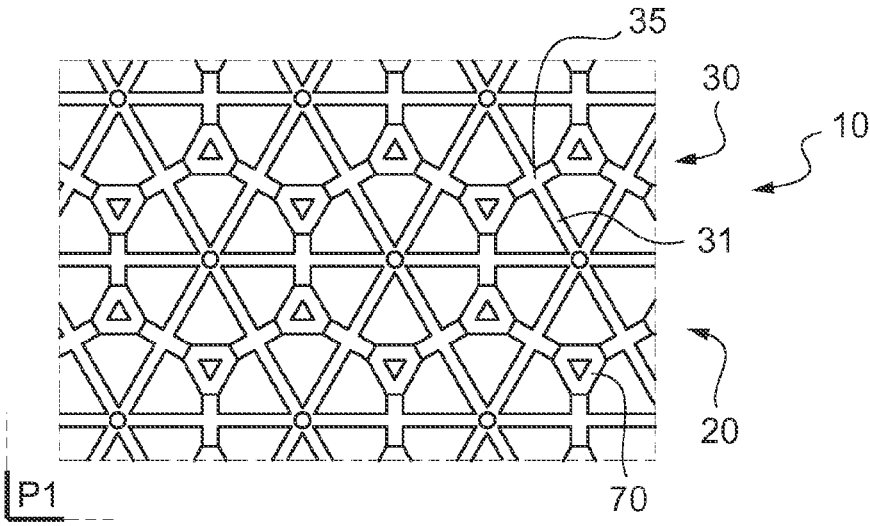

Furthermore, FIGS. 9 to 11 show a covering 10 having at least one weight member 70 extending between at least two blades 31 of two resonators 30. For example, a weight member 70 interconnects at least two protuberances 35 of at least two blades 31 of two resonators 30.

In FIG. 9, a weight member comprises a ring surrounding a star, the ring being connected to three respective protuberances of three blades.

In FIG. 10, a weight member comprises a three-branched star, each branch being connected to a protuberance of a blade.

In FIG. 11, a weight member is triangular in shape being connected via its vertices to three respective protuberances of three blades.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A soundproofing covering having resonators, wherein said covering comprises a trellis provided with at least two resonators and at least one stud for fastening at least two resonators to a panel that is to be treated, each resonator including a blade extending longitudinally in a plane from one end of the resonator that is fastened to a stud to another end of the resonator, said blade having at least one transverse protuberance for oscillating in an elevation direction perpendicular to said plane, each stud extending in elevation from a face for securing to the panel that is to be treated towards each resonator fastened to the stud, at least one stud having damper means interposed between said face and each of the resonators fastened to the stud, at least one stud comprising a base provided with a face for securing to a panel that is to be treated and a shank passing through one end of at least one resonator, radial clearance separating each shank from the resonator, said stud including attachment means clamping one end of at least one resonator against the base.

2. A covering according to claim 1, wherein a resonator has a first width that is constant between said ends of the resonator in a transverse direction, excepting at least one zone of the blade of the resonator that includes a protuberance that presents a second transverse width greater than the first width.

3. A covering according to claim 1, wherein at least two resonators present protuberances having geometries that are distinct.

4. A covering according to claim 3, wherein said at least two resonators present blades that are identical excepting their protuberances that present geometries that are distinct.

5. A covering according to claim 1, wherein at least two resonators connected to a common stud present an end in common.

6. A covering according to claim 1, wherein at least one resonator is connected to a first stud via one end and to a second stud via another end.

7. A covering according to claim 1, wherein said trellis is a machined plate, each resonator having at least one end in common with another resonator.

8. A covering according to claim 1, wherein at least one blade has a thickness in said elevation direction that is less than one millimeter.

9. A covering according to claim 1, wherein at least one blade presents a protuberance at equal distances from a first end and a second end of said blade.

10. A covering according to claim 1, wherein the covering includes a cover for protecting said trellis.

11. A covering according to claim 1, wherein said damper means comprise a damper washer surrounding each stud.

12. A covering according to claim 1, wherein said covering includes at least one weight member connecting together at least two blades of two resonators.

13. A covering according to claim 12, wherein said weight member connects together at least two protuberances of at least two blades of two resonators.

14. A covering according to claim 1, wherein said trellis comprises a machined plate having a plurality of resonators, each resonator extending longitudinally between two perforated ends, each end being common to a plurality of resonators, each end being engaged on a shank of a stud, each stud being surrounded in part by a damper washer.

15. A covering according to claim 1, wherein at least one protuberance of at least one resonator is made up of two transverse extensions extending transversely on either side of a blade, a longitudinal axis of symmetry of the blade representing an axis of symmetry of the transverse extensions.

16. A panel having at least one wall, wherein said wall includes at least one covering according to claim 1, each trellis of a covering being fastened to a wall of the panel solely by the studs of the trellis.

17. An aircraft, wherein the aircraft includes a panel according to claim 16.

* * * * *